Dec. 17, 1935.　　　I. C. GELLMAN　　　2,024,414
BREAD SLICING MACHINE
Filed July 1, 1931　　　2 Sheets-Sheet 1
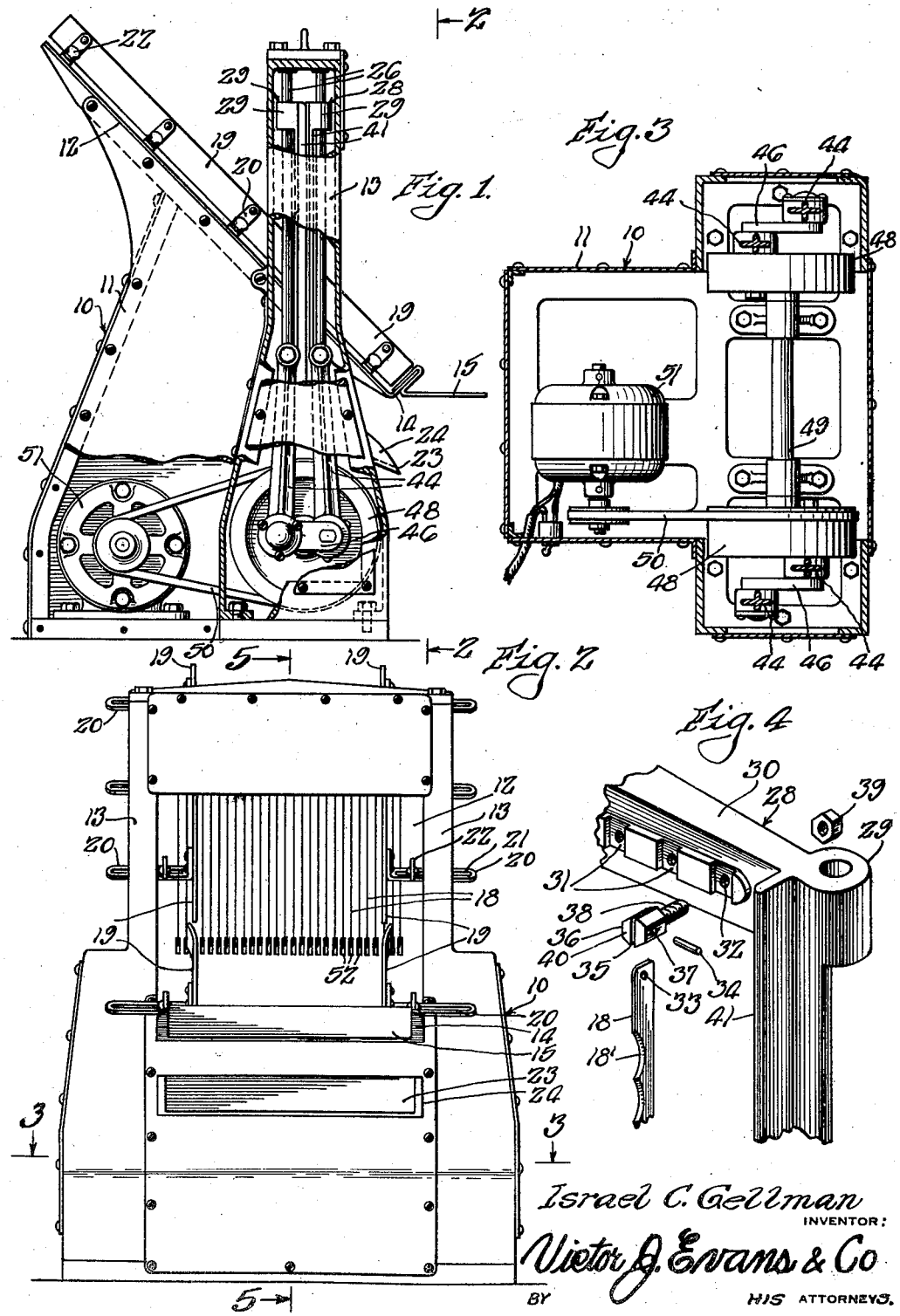

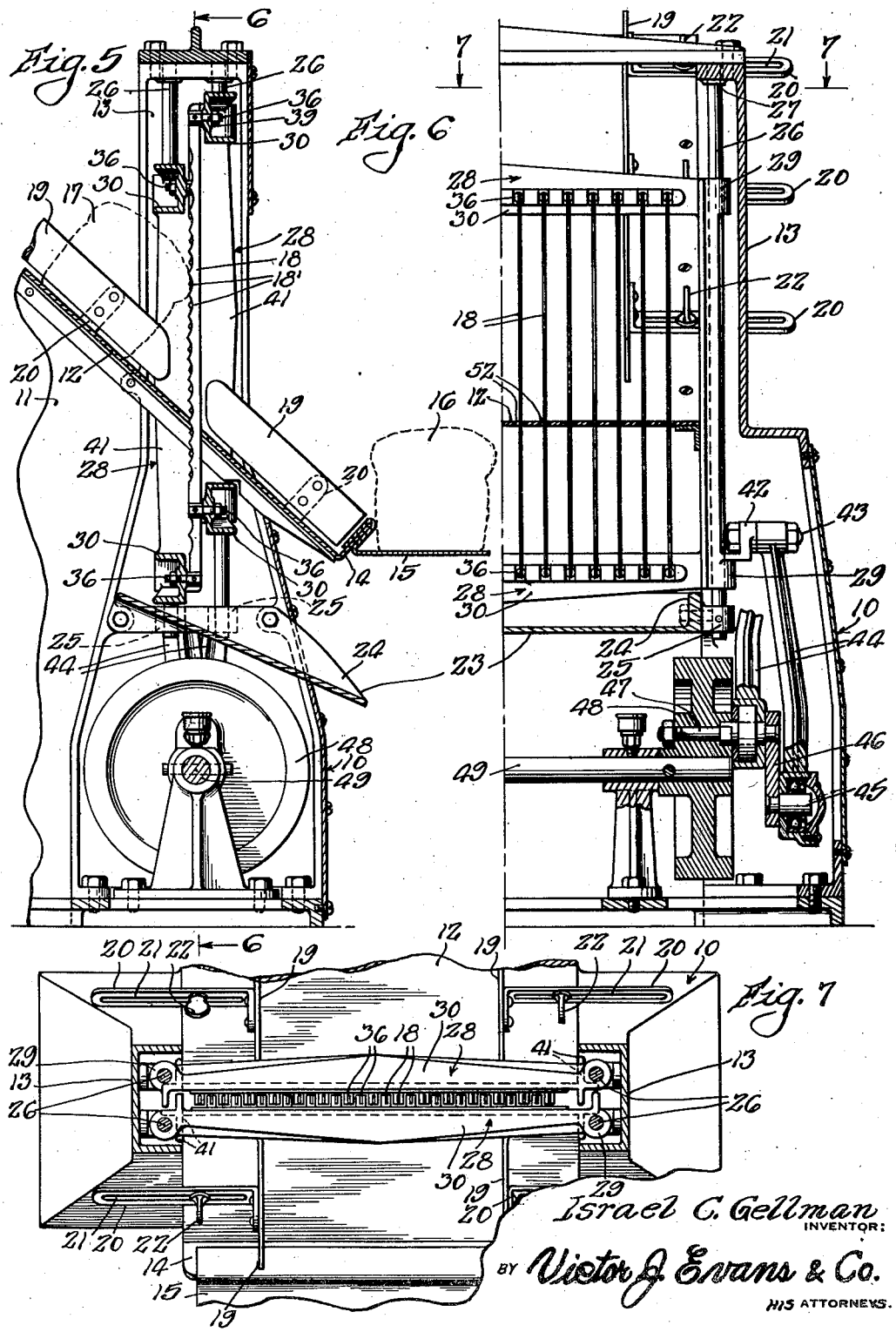

Patented Dec. 17, 1935

2,024,414

UNITED STATES PATENT OFFICE 2,024,414

BREAD SLICING MACHINE

Israel C. Gellman, Rock Island, Ill.

Application July 1, 1931, Serial No. 548,244

5 Claims. (Cl. 146—153)

This invention relates to certain novel improvements in bread slicing machines, and has for its principal object the provision of an improved construction of this character which will be highly efficient in use and economical in manufacture.

It has been determined from experience that forcing fresh bread through the cutting knives of a bread slicing machine, by a pusher bar or other mechanism, causes the bread to crumble, while tearing the bread both inside and outside of the loaf. It is, therefore, one of the objects of this invention to provide an improved bread slicer which feeds the loaves by gravity to the cutting knives, without the use of a pusher mechanism, and which is so arranged that smooth slices are cut, without forming crumbs between the slices, or tearing the loaves.

It is another object of the invention to provide an improved arrangement of reciprocating cutting knives and supporting frames therefor that are a one-piece solid unit, light and strong.

Another object of the invention resides in providing improved means for tensioning the cutting knives.

A further object of the invention resides in the provision of improved means for operating the reciprocating cutting knife frames and the knives carried thereby, so that the machine may be operated at high speed with very little vibration, one frame tending to counterbalance the other.

An additional object of the invention resides in providing two groups of knives which in operation eliminates the tendency a single group of knives has to cut and tear the loaves during the slicing operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of a preferred construction of the invention with a part of the casing therefor broken away;

Fig. 2 is a front elevational view on line 2—2 in Fig. 1;

Fig. 3 is a sectional view on line 3—3 in Fig. 2;

Fig. 4 is a perspective view of special means provided for tensioning the cutting knives;

Fig. 5 is a sectional view on line 5—5 in Fig. 2;

Fig. 6 is a sectional view on line 6—6 in Fig. 5; and

Fig. 7 is a sectional view on line 7—7 in Fig. 6.

In the drawings, which illustrate a preferred and practical embodiment of the invention, indicated generally at 10 is a housing within which certain of the operating parts to be described hereinafter are disposed, and this housing includes a part 11 which supports a feed chute 12 that is inclined at an acute angle to the horizontal. Projecting upwardly from the housing 10 are spaced hollow uprights or posts 13 between which the feed trough 12 extends, the feed chute terminating at its forward lower end in a flange 14 which may carry a removable tray 15 to which the slices 16 may be removed from the chute 11 as they are cut from the loaves 17 that are fed down the chute 11 by gravity against the slicing knives 18 that are reciprocally mounted in frames 28, each of the knives of one frame being disposed midway between two adjacent knives of the other frame, as shown in Fig. 7, with the serrated cutting edges 18' all lying in one vertical plane.

Slidably mounted on the chute 11 are guide wings 19 to which are attached bars 20 provided with guide slots 21 through each of which projects a thumb screw 22 that is threaded into an aperture provided therefor in chute 11. By adjusting the thumb screws 22 the wings 19 may be moved toward or away from each other so as to vary the space therebetween and the width of chute 11 for the passage therealong of loaves 17 of different sizes, and for guiding the slices after the same have been cut from the loaves.

Disposed below the feed chute 11 and opening at the front of the housing 10 is a crumb chute 23. The crumb chute 23 includes flanges 24 on which are provided means 25 in which the lower ends of rods 26 are mounted, the rods 26 being arranged in pairs (Fig. 7) extending through the uprights 13 and having their upper ends suitably fixed to the tops 27 of the uprights 13. Slidably mounted on each pair of rods 26 for vertical reciprocatory movement and by means of collars 29 are my improved knife-carrying frames, generally indicated at 28, and each of which includes the top and bottom channel-shaped rails 30 (Figs. 4 and 5) on one face of which are provided vertical slots, into which open apertures 32 that lead through the channel shaped rails 30. The cutting knives 18 are inserted into kerfs 35 in studs 36 that are provided with pin slots 37, and the knives 18 are arranged in two rows with the serrated edges of the knives directed toward the rear of the machine. The knives are provided at each end with an aperture 33 (Fig. 4) through which a pin 34 passes, by way of slots 37, for securing the knives to the studs 36 which are inserted through the apertures 32. Corresponding apertures 32 on the top and bottom rails 30 are aligned, and the distance between these apertures in the top and bottom rails 30 is made slightly greater than the distance between the apertures 33 in the end portions of the knives 18 so that when the studs 36 are inserted through the apertures 32 the treaded shanks 38 of the studs attached to each blade will be inclined away from each other, pivoting on pins 34. Therefore, when the nuts 39 are tightened up onto the shanks 38 within the rails 30 the studs 36 will be brought into position parallel to each other and substantially at right angles to the knife 18, thereby tensioning the blades 18 on the cutting frames 28. The heads 40 of the studs will then be disposed in the slots 31 which will prevent side or lateral play of the knives. Guiding flanges 41 are provided on the sides of the frames 28 and these flanges prevent sidewise entrance into the knives, for safety in operation.

The invention includes eccentric means for translating rotary motion of the shaft 49 into reciprocating rectilinear motion of the cutting frame and knives, which will now be described: Extending from the lower sleeves 29 on the frames 28 are apertured brackets 42 (Fig. 6) which carry pins 43 upon which are mounted bearing collars of connecting rods 44. The lower ends of the connecting rods 44 of one frame are rotatably mounted on studs 45 carried by throws 46 that are rotatably connected to pins 47 in the fly wheels 48 of shaft 49, the connecting rods of the other frame being rotatably mounted on the pins 47 so that when the fly wheels 48 and shaft 49 are rotated by belt and motor 51 the frames 28 and their knives will reciprocate vertically in the rods 26 and oppositely to each other, the knives 18 passing through slots 52 in the chute 11 and slicing the loaves 17 fed by gravity down the chute 11.

It will be noted that by the opposite arrangement of the rails 30 on the two frames (Fig. 5) the knives 18 (Fig. 7) all lie in the same plane so that both groups of knives engage the loaves at the same time.

From the foregoing description it will, therefore, be apparent to persons skilled in the art that my invention, employing as it does a gravity feed for the loaves to the knives, and no pusher mechanism, will slice the loaves in smooth, well-defined slices without crumbling the slices or tearing the loaves, there being no pressure or impact of a pusher mechanism against the loaves as they are fed against the knives.

By the tensioning means described and illustrated in Fig. 4, the knives 18 may be kept taut at all times, while the frames 28, being solid one-piece units are both rigid, light, and strong and will not buckle, nor permit the knives to buckle.

The mechanism for reciprocally operating the cutting-knife frames from the rotary crank shaft 49 (as described and as illustrated in Figs. 1, 3 and 4) runs quietly at high speed and with little vibration. Moreover, each of the two frames counterbalances the other, as to the working parts and also as to the effect of the knives on the loaves, for when one frame and its knives are moving up the other frame and its knives are moving down, so that when one group of knives is cutting upwardly through the loaf in one set of channels the other group is cutting down in different channels thereby destroying the tendency of a single group of knives to tear and crumble the loaf.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a bread slicing machine, reciprocatory knife-carrying frames, including top and bottom rails and each rail being provided with a series of spaced apertures, cutting knives having end portions provided with apertures and said second-named apertures in each knife being spaced apart a distance less than the distance between one of the first-named apertures in the top rail and a corresponding one of said first-named apertures in the bottom rail, means pivotally connected to the knives at the second-named apertures, and insertible through the first-named apertures obtusely with respect to the knives, and means for drawing the first-named means into parallel relation and at the same time tensioning the blades.

2. In a bread slicing machine, reciprocatory knife-carrying frames, including top and bottom rails and each rail being provided with a series of spaced apertures, cutting knives having end portions provided with apertures and said second-named apertures in each knife being spaced apart a distance less than the distance between one of the first-named apertures in the top rail and a corresponding one of said first-named apertures in the bottom rail, studs pivotally connected to the knives at the second-named apertures, and including threaded shanks insertible through the first-named apertures obtusely with respect to the knives, and nuts for drawing the studs into parallel relation and at the same time tensioning the blades.

3. In a bread slicing machine, reciprocatory knife-carrying frames, including top and bottom rails and each rail being provided with a series of spaced slots and apertures opening into the slots and extending through the rails, cutting knives having end portions provided with apertures and said second-named apertures in each knife being spaced apart a distance less than the distance between one of the first-named apertures in the top rail and a corresponding one of said first-named apertures in the bottom rail, studs including heads receivable in the slots and pivotally connected to the knives at the second-named apertures, and including threaded shanks insertible through the first-named apertures obtusely with respect to the knives, and nuts for drawing the studs into parallel relation and at the same time tensioning the blades.

4. A bread slicing machine comprising the combination of a structure including supporting elements, alternating series of spaced substantially vertically reciprocating slicing knives supported by said elements, the knives of one series being positioned in alternate relationship to the knives of the other series and means for substantially vertically reciprocating the knives of one series simultaneously in opposite direction to the knives of the other series, a gravity feed chute supported by said structure in an inclined plane with respect to the vertical plane of movement of said knives and having slots through which said knives reciprocate for slicing operation upon loaves of bread gravitated to and beyond said knives by said chute.

5. A bread slicing machine comprising alternating series of spaced substantially vertical reciprocating slicing knives, the knives of one series being positioned in alternate relationship to the knives of the other series, means for substantially vertically reciprocating the knives of one series simultaneously in opposite direction to the knives of the other series, and a gravity feed chute, through which the knives extend, disposed in an inclined plane with respect to the vertical plane of movement of the knives for gravitating loaves of bread into slicing engagement with respect to the knives and beyond said knives after said slicing operation on said loaves of bread by said knives.

ISRAEL C. GELLMAN.